US012618750B2

(12) United States Patent
Kirmse et al.

(10) Patent No.: US 12,618,750 B2
(45) Date of Patent: *May 5, 2026

(54) METHOD FOR GENERATING A SERIES OF ULTRA-THIN SECTIONS USING AN ULTRAMICROTOME, METHOD FOR THREE-DIMENSIONAL RECONSTRUCTION OF A MICROSCOPIC SAMPLE, ULTRAMICROTOME SYSTEM AND COMPUTER PROGRAM

(71) Applicant: LEICA MIKROSYSTEME GMBH, Vienna (AT)

(72) Inventors: Robert Kirmse, Vienna (AT); Robert Lange, Vienna (AT); Peer Oliver Kellermann, Vienna (AT); Robert Ranner, Vienna (AT); Mario Noessing, Vienna (AT)

(73) Assignee: LEICA MIKROSYSTEME GMBH, Vienna (AT)

( * ) Notice: Subject to any disclaimer, the term of this patent is extended or adjusted under 35 U.S.C. 154(b) by 671 days.

This patent is subject to a terminal disclaimer.

(21) Appl. No.: 18/010,473

(22) PCT Filed: Jun. 17, 2021

(86) PCT No.: PCT/EP2021/066400
§ 371 (c)(1),
(2) Date: Dec. 15, 2022

(87) PCT Pub. No.: WO2021/255163
PCT Pub. Date: Dec. 23, 2021

(65) Prior Publication Data
US 2023/0221214 A1 Jul. 13, 2023

(30) Foreign Application Priority Data
Jun. 17, 2020 (EP) .................................... 20180467

(51) Int. Cl.
*G01N 1/06* (2006.01)
*G01N 1/28* (2006.01)
(Continued)

(52) U.S. Cl.
CPC .............. *G01N 1/06* (2013.01); *G01N 1/2813* (2013.01); *G06T 7/0012* (2013.01); *G06T 7/70* (2017.01);
(Continued)

(58) Field of Classification Search
None
See application file for complete search history.

(56) References Cited

U.S. PATENT DOCUMENTS 5,746,855 A 5/1998 Bolles
7,677,289 B2 3/2010 Hayworth et al.
(Continued)

FOREIGN PATENT DOCUMENTS

KR 102254822 B1 * 5/2021 .............. G01N 1/06
WO WO 2008/066846 A2 6/2008
(Continued)

OTHER PUBLICATIONS

EP 21732329 Official action filed by EPO in Jan. 19, 2026 (10 pages) (Year: 2026).*
(Continued)

*Primary Examiner* — P. Kathryn Wright
(74) *Attorney, Agent, or Firm* — LEYDIG, VOIT & MAYER, LTD.

(57) ABSTRACT

A method for generating a series of ultra-thin sections of a microscopic sample is provided. The method includes detaching the sections from the sample using an ultramicrotome. The sections detached from the sample are made to float on a liquid surface and thereafter are transferred onto a solid carrier element. The method also includes determin-
(Continued)

ing, for at least one of the sections detached from the sample, a position and an orientation on the solid carrier element by monitoring the placement of the sections onto the solid carrier element using a monitoring system comprising a camera, and obtaining monitoring data.

13 Claims, 6 Drawing Sheets

(51) Int. Cl.
  *G06T 7/00* (2017.01)
  *G06T 7/70* (2017.01)

(52) U.S. Cl.
  CPC .............. *G06T 2207/10061* (2013.01); *G06T 2207/30024* (2013.01)

(56) References Cited

U.S. PATENT DOCUMENTS

| | | | |
|---|---|---|---|
| 11,238,626 B2* | 2/2022 | Kellermann | G06T 7/55 |
| 2018/0080856 A1* | 3/2018 | Hayworth | G01N 1/06 |
| 2019/0301980 A1* | 10/2019 | Anderson | G01N 35/00029 |

FOREIGN PATENT DOCUMENTS

| | | |
|---|---|---|
| WO | WO 2012/033842 A2 | 3/2012 |
| WO | WO 2018/094290 A1 | 5/2018 |

OTHER PUBLICATIONS

Horstmann, H. et al., Serial Section Scanning Electron Microscopy (S3EM) on Silicon Wafers for Ultra-Structural vol. Imaging of Cells and Tissues, PLoS ONE 7(4), Apr. 2012, pp. 1-8, US-.

Harris, K.M. et al., Uniform Serial Sectioning for Transmission Electron Microscopy, J. Neurosci. 26(47), Nov. 22, 2006, Society for Neuroscience, US, pp. 12101-12103.

Li et al., "Large scale three-dimensional reconstruction of an entire *Caenorhabditis elegans* larva using AutoCUTS-SEM," J Struct Biol 200, Oct. 2017, pp. 87-96, Elsevier, Netherlands.

Pichat, Jonas et al.; "A Survey of Methods for 3D Histology Reconstruction"; *Medical Image Analysis*; Feb. 21, 2018; pp. 73-105; vol. 46; XP085381901; Elsevier; Amsterdam, NL.

* cited by examiner

METHOD FOR GENERATING A SERIES OF ULTRA-THIN SECTIONS USING AN ULTRAMICROTOME, METHOD FOR THREE-DIMENSIONAL RECONSTRUCTION OF A MICROSCOPIC SAMPLE, ULTRAMICROTOME SYSTEM AND COMPUTER PROGRAM

CROSS REFERENCE TO RELATED APPLICATIONS

This application is a U.S. National Phase application under 35 U.S.C. § 371 of International Application No. PCT/EP2021/066400, filed on Jun. 17, 2021, and claims benefit to European Patent Application No. EP 20180467.1, filed on Jun. 17, 2020. The International Application was published in English on Dec. 23, 2021 as WO 2021/255163 A1 under PCT Article 21(2).

FIELD

The present invention relates to a method for generating a series of ultra-thin sections of a microscopic sample using an ultramicrotome, to a method for three-dimensional reconstruction of a microscopic sample from a series of sections, to an ultramicrotome system, and to a computer program.

BACKGROUND

Investigations of series of sections, in particular by electron microscopy, and reconstruction of three-dimensional sample information from such series, are very important, in particular in neuroscience but also in other fields of biology and medicine.

Corresponding methods encompass, inter alia, "serial section scanning electron microscopy" (ssSEM, S³EM) and "serial section transmission electron microscopy" (ssTEM). In contrast to so-called thin sections generated using a regular microtome for light microscopy, having a typical thickness of about 5 μm, the section thicknesses in ultramicrotomy are generally below 1 μm or below 500 nm and for example between 10 and 200 nm or 25 and 100 nm, to enable them for use with different types of electron microscopy. In ultramicrotomy, glass or diamond blades are typically used. The ultra-thin sections are collected in a water trough and can be collected from there, as described below.

Particularly as a result of the low sample thicknesses and the particular design of the equipment used, ultramicrotomy substantially differs from other methods of generating sample sections such the one disclosed in WO 2018/094290 A1, for example, where a sectioning process involves embedding of tissue in a support material such as a wax, resin, ice, or gel, and then slicing it using a microtome or vibrating blade microtome to a thickness in the order of micrometers to hundreds of micrometers, and where an attractive force pulls a tissue slice into contact with a support substrate or pallet as the tissue slice is being sectioned from the sample block in a water bath.

As described, for example, in Horstmann, H. et al., Serial Section Scanning Electron Microscopy (S³EM) on Silicon Wafers for Ultra-Structural Volume Imaging of Cells and Tissues, PLoS ONE 7(4), 2012, e35172, by means of ssSEM it is possible to provide a high-resolution, three-dimensional (3D) depiction of cellular ultrastructure. In contrast to ssTEM (explained below), which permits an investigation of restricted sub-cellular volumes but by no means a complete ultrastructural reconstruction of large volumes, entire cells, or entire tissues, the latter is possible using ssSEM.

In ssSEM, serial sectioning of tissues is combined with scanning electron microscopy (SEM), in particular using a conductive wafer as a carrier. In ssSEM, section ribbons having hundreds of sections with a thickness of, for example, 35 nm may be generated, and are imaged on the wafer with a lateral pixel resolution of, for example 3.7 nm. Back-scattered electrons can be recorded using the "in-lens" detector of the SEM. The images resulting from such a method are comparable in quality to those of a conventional TEM. The essential advantage of ssSEM is that comparatively large structures, for example in the range of tens to hundreds of cubic micrometers, can be reconstructed with it.

The more conventional ssTEM method is described, for example, in Harris, K. M. et al., Uniform Serial Sectioning for Transmission Electron Microscopy, J. Neurosci. 26(47), 2006, 12101-12103. ssTEM can also be superior to other methods for reconstructing three-dimensional sample information, such as confocal microscopy, in particular because of the high resolution.

A sample for ssSEM and ssTEM is prepared for processing in known fashion and embedded, for example, in agarose or in suitable plastics. Section ribbons, in which the individual sections adhere to one another, are produced from the embedded sample using an ultramicrotome, by setting a suitable advance rate. Corresponding section ribbons float in a liquid bath and are removed using suitable transfer devices ("slot grids" or, in the case of ssSEM, also wafers) for further investigation. It is also possible not to allow the resulting section ribbons to float on a liquid bath but instead to transfer them directly onto a suitable carrier, for example a wafer.

The location of an individual section in the specimen being investigated corresponds to its location in a section ribbon that has been generated, and vice versa. It may therefore be important, in corresponding methods, to generate section ribbons that are as long and uninterrupted as possible, thereby allowing the location of the individual sections in the sample as a whole to be described. As indicated in the technical literature cited, however, it is not always possible to ensure this, for example with certain embedding materials. For long section ribbons, correspondingly long liquid baths or receiving devices are necessary, and handling of the sections becomes difficult. The desired generation of multiple section ribbons also typically proves to be not unproblematic in practice, and requires skill and long experience. For further details, reference is made to the expert literature cited. These problems are particularly relevant in connection with ultramicrotomy due to the extremely low thickness of the sections generated.

It is also known, in order to overcome the disadvantages of the processes mentioned in relation to generating section ribbons, to generate individual sections rather than section ribbons, and to fish those sections successively out of a liquid bath using a conveyor belt before they can drift away. The conveyor belt may be embodied here to be essentially endless, and the sequencing of the sections on the belt corresponds to the section sequence because individual sections are typically fished from the liquid bath one by one.

In WO 2008/066846 A8, for example, an "automatic tape collecting lathe ultramicrotome" (ATLUM) is proposed which slices a block of tissue sample having various geometries into a continuous ribbon of thin tissue, or multiple thin tissue sections, and disposes the sliced thin tissue on an appropriate substrate to facilitate subsequent imaging of the sliced thin tissue. Closed-loop control of section thickness of the sliced thin tissue sections or ribbons is implemented to produce thinner sliced tissue sections or ribbons and tightly regulate thickness. Thin tissue sections or ribbons may be particularly processed/prepared to facilitate imaging with a scanning electron microscope (SEM). Collected thin tissue sections or ribbons may be used to create Ultra-Thin Section Libraries (UTSLs) that allow for fully automated, time-efficient imaging in the SEM to facilitate expansive tissue studies.

In Li et al., "Large scale three-dimensional reconstruction of an entire Caenorhabditis elegans larva using AutoCUTS-SEM", J Struct Biol 200 (2007) 87, a methodology is reported which is termed "automatic collector of ultra-thin sections scanning electron microscopy" and this methodology is used to generate a 3D reconstruction of an entire C. elegans larva with 100 nm axial and 15 nm lateral resolution. Compared to the current available ATUM (automated tape-collecting ultramicrotome) technique, the method is intended to be an alternative complete solution that can be applied to obtain large scale 3D ultrastructure of tissues.

An automatic taping lathe-microtome that produces a continuous ribbon of tissue by lathing an extremely thin strip off the surface of a cylindrical block containing a multitude of embedded tissue samples is also disclosed in U.S. Pat. No. 7,677,289 B2. Mechanisms are included for sandwiching this fragile ribbon of tissue between a pair of support tapes. Viewing holes are cut in the support tapes above and below each tissue slice such that the tapes act as slot grids allowing for direct viewing of each tissue slice in a transmission electron microscope (TEM). The resulting tissue-tape is placed on a spooling mechanism and fed into the beam of a TEM much like the film in a movie projector. This allows for random-access imaging of any section on the tape without requiring the TEM's vacuum be broken. This system is intended to give neuroscientists a tool to ultrastructure image large volumes of neural tissue and to trace multi-scale synaptic circuits.

U.S. Pat. No. 5,746,855 A discloses a method and an apparatus for the archival storage of tissue sections which have been cut from a sample block by a microtome blade, wherein a tape bearing serially-spaced areas of adhesive material, generally the same size as the surface of the tissue sample block, is provided. The tape may be delivered from a feed reel by a feed roller mechanism. Between each cut, the tape is advanced to align the adhesive area on the tape with the tissue sample. An application roller presses the adhesive against the sample, the section is cut, and a takeup roller lifts the tape and section away from the blade. The tape may then be wound onto a takeup reel for archival storage. The entire process may be automated, including the operation of a transport mechanism to move the apparatus away from the tissue sample during microscopic imaging.

In WO 2012/033842 A2 methods, apparatuses and systems for facilitating automated or semi-automated collection of tissue samples cut by a microtome are disclosed. In one example, a collection apparatus may be moved back and forth between respective positions at which the collection apparatus is operatively coupled to a microtome so as to collect cut tissue samples, or routine access to the microtome is provided. A fluid reservoir receives samples cut by the microtome, and the collection apparatus may collect samples via a conveyor-like substrate disposed near/in the reservoir. A linear movement of the substrate may be controlled based on a cutting rate of the microtome, and the fluid level in the reservoir may be automatically maintained to facilitate effective sample collection.

SUMMARY

In an embodiment, the present disclosure provides a method for generating a series of ultra-thin sections of a microscopic sample. The method includes detaching the sections from the sample using an ultramicrotome. The sections detached from the sample are made to float on a liquid surface and thereafter are transferred onto a solid carrier element. The method also includes determining, for at least one of the sections detached from the sample, a position and an orientation on the solid carrier element by monitoring the placement of the sections onto the solid carrier element using a monitoring system comprising a camera, and obtaining monitoring data.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figures 1A, 1B:
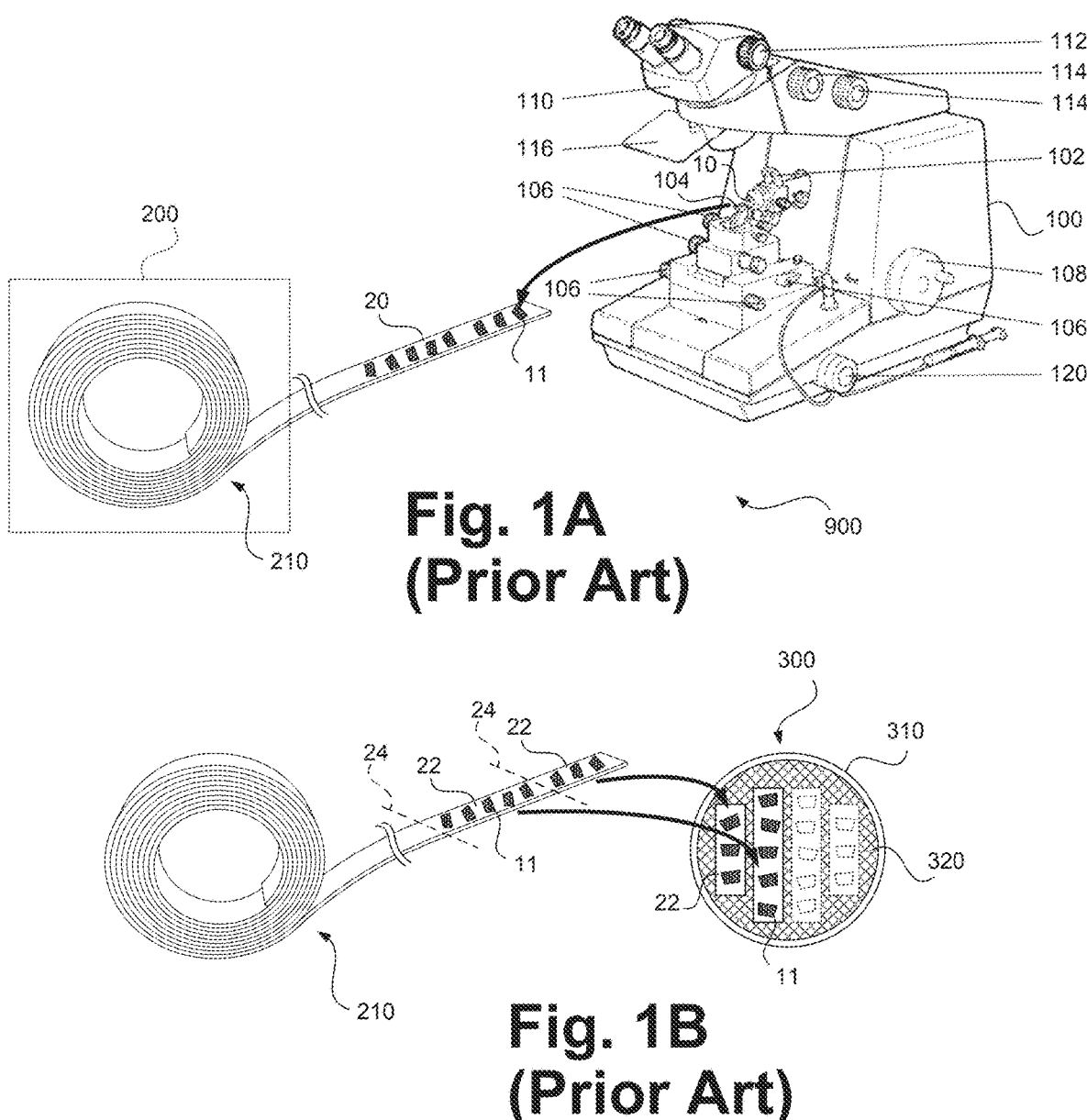
FIG. 1A to 1C are highly simplified perspective views of an arrangement used in a method not in accordance with embodiments of the invention.

Embodiments of the present invention can be utilized especially in conjunction with ssSEM. It is understood, however, that the principles explained below can also apply in particular to other methods of comparable types. All embodiments of the present invention, however, relate to ultramicrotomy, in which, as generally known to the skilled person, so-called ultra-thin sections are prepared as required for the examination of samples in an electron microscope. Embodiments of the present invention may particularly relate to methods and systems wherein a tape-, belt- or ribbon-like carrier element is used to collect tissue sections, like in the cases just mentioned, but generally may be used with all types of solid carrier elements which can be used to temporarily or permanently store tissue sections for examination in all types of microscopy using ultra-thin sections, including, but not limited, to (ss)SEM and (ss)TEM. The sections are, according to embodiments, transferred to such solid carrier elements by initially collecting or causing them to float in a water bath and thereafter "fishing" them out of the water bath by an automated, semi-automated or manual system, in order to place them onto the solid carrier element. The solid carrier element may be used as a continuous or endless carrier element which later may be cut into sections to be placed onto a transfer device like a slot grid or a wafer, but any type of further processing is possible in the context of the embodiments.

While some systems of the prior art which use ribbon-like carrier elements strip off sections from the surface of a cylindrical block containing a multitude of embedded tissue samples, as mentioned, embodiments of the present invention may be used with other ways of sectioning as well, such as in more classical ultramicrotomes in which a sample block is moved upwards and downwards or forwards and backwards for generating ultra-thin sections. Section ribbons, in which the individual ultra-thin sections adhere to one another, but also individual sections may be placed onto ribbon-like solid carrier element one after the other.

In light of the above, embodiments of the present invention can provide improved solutions for producing ultra-thin section series using an ultramicrotome which are suitable for three-dimensional reconstruction of a corresponding sample.

In light of the above, embodiments of the present invention propose a method for generating a series of ultra-thin sections of a microscopic sample using an ultramicrotome, a method for three-dimensional reconstruction of a microscopic sample, an ultramicrotome system, and a computer program.

In the method proposed according to embodiments of the present invention for generating a series of ultra-thin sections of a microscopic sample, the sections, as is generally known in this connection, are detached from the sample by means of an ultramicrotome comprising a suitable blade and then placed onto a solid carrier element.

Corresponding methods have already been explained in some detail above. Embodiments of the present invention can be utilized in particular in conjunction with electron-microscopy methods and is used in connection with ultra-microtomes. In ultramicrotomes, so-called ultra-thin sections are generated. In general, the sections generated in the context of embodiments of the present invention can have any thicknesses that can be generated using corresponding apparatuses and which are generally referred to as being "ultra-thin". For example, the sections generated with a diamond knife utilizing a liquid bath, in which the sections may be collected individually or in groups before being placed onto the solid carrier element, typically have thicknesses from approx. 10 nm to 300 nm. These section thicknesses, and in particular section thicknesses from approx. 10 to 100 nm or from approx. 10 nm to 50 nm, can be used in the context of ssSEM as mentioned earlier. When a "section" is mentioned hereinafter, it is therefore assumed that microscopic sections of all typical section thicknesses for ultra-thin sections are encompassed, and any reference to a "section" shall be construed to be a reference to an ultra-thin section. In general, a section thickness of less than 1 μm and for example more than 1 nm, particularly less than 500 nm and particularly more than 10 nm, further particularly less than 300 nm or 100 nm and more than 20 nm may be used according to embodiments of the present invention. Similarly, any reference to a "microtome" shall be construed to be a reference to an ultramicrotome. An ultramicrotome is particularly characterized in that it is adapted to produce ultra-thin sections and is particularly adapted to produce sections using diamond knives and to cause the sections to float on a liquid surface.

In WO 2018/094290 A1, as mentioned, a system for sectioning large samples and for producing sections significantly thicker than foreseen according to embodiments of the present invention is provided. In contrast to the embodiments, the samples are, according to this disclosure, sectioned under water and the obtained section are then transferred directly, i.e. each section after its separation, to a carrier tape. Thicknesses of the sections are, according to this disclosure, indicated to be in the range of 10 to 1000 μm and typically 50 to 100 μm, which is one order of magnitude higher than according to embodiments of the present invention. The specific operation of the cutting device, as mentioned, particularly includes that each cut is transferred, immediately after being produced, to the carrier tape, particularly by adhesive forces.

Due to the specific design of the cutting process in WO 2018/094290 A1, which is specifically adapted to form comparatively thick sections from large samples under water, a gapless transfer of the sections is ensured by the operating principle. A loss of sections is therefore essentially avoided, so that a user can always rely on the fact that sections positioned one after the other on the cutting tape have also been separated from the sample in a corresponding, and above all gap-free, sequence. Due to the large sample thickness, the execution of faulty cuts, producing crumpled sections or sections which may adhere to the blade, is less likely. That is, one can reliably assume that every movement of the blade will also lead to the production of a section. The sections are produced in the immediate vicinity of the carrier ribbon to which they are transferred, and are deposited on it immediately after they have been produced. In this way, drifting away or other loss of cuts is virtually excluded. Furthermore, the sections produced here are mechanically much more stable due to the thickness thereof and these do not tend to fold over or tear, for example. Therefore, monitoring the cutting process and the transfer of the cuts to the carrier ribbon is not necessary here.

Sections produced by ultramicrotomy, according to embodiments of the present invention, and in which sections are separated from the sample and are caused to float on a liquid surface, are, on the one hand, much more fragile and their production can be subject to errors, and they are more likely to tear, fold over, and generally disintegrate. Causing sections to float on a liquid surface is typically necessary to "stretch" the samples, i.e. to counteract deformations caused by the sectioning process. As ultramicrotomy is generally a field of technology substantially different from other forms of microtomy, such as that disclosed in WO 2018/094290 A1, the skilled person would not have considered such other forms of microtomy including solutions applicable for ultramicrotomy.

As mentioned, the solid carrier element used according to embodiments of the present invention may be a ribbon-like structure which may be provided and positioned using a corresponding feeding unit which may form part of a microtome system provided according to embodiments of the present invention. In such cases, the solid carrier element may especially be provided in the form of a reel or roll, and has some structural flexibility. In other cases, however, embodiments of the present invention may also be used with more rigid solid carrier elements. The term "solid" is therefore used here to characterize a material which, in contrast to a liquid bath, is in the form of solid matter, but may be flexible.

Embodiments of the present invention can relate in particular to the generation of sections for methods in which the sections are microscopically imaged, as explained further below, and in which a reconstruction of three-dimensional data (volume image data) from the correspondingly imaged sections is accomplished. As mentioned, for this task it is particularly necessary to generate uninterrupted section series and to associate the respective sections with the sequence in which they were detached from the sample and thus with the position in the volume image data. The embodiments make this possible by generating monitoring data, particularly by detecting moving-image data (video data) and by tracking the generated sections in the moving-image data.

Furthermore, in order to generate three-dimensional data in a fast, reliable and reproducible manner, it is particularly preferable to have data available which describe the position and/or orientation of the sections to be imaged on the solid carrier element and to be assembled into the three-dimensional data. Such information can in theory be obtained exclusively from the section images, e.g. by suitable image recognition and registration algorithms. However, the generation of the three-dimensional image data is significantly improved and facilitated if independent information relating to such parameters is present before the actual task of image registration or three-dimensional reconstruction is performed. This is accomplished by embodiments of the present invention, in which for at least some of the sections detached from the sample a position and an orientation on the solid carrier element are determined by monitoring the placement of these sections onto the solid carrier element using a monitoring system. Therefore, corresponding information may be obtained to support the generation of the three-dimensional image data, making said generation more reliable. It is thus possible, despite drifting, rotating or displacement motions, disintegration of section ribbons, distortions and the like during the placement of the sections onto the solid carrier element, always to reliably associate the individual sections in terms of their location in the overall specimen or in a corresponding volume image, and provide the required adjustment for inclusion into a three-dimensional representation. It is known that successive sections are often very similar, and that any other association is therefore almost impossible.

In principle, various devices can be utilized in the context of embodiments of the invention in order to collect the sections that have been generated. As mentioned, the use of liquid baths is known in particular in this connection, the sections being collected on a corresponding liquid surface. A typical liquid is (deionized) water. In embodiments of the present invention, however, the sections are, even if they are initially collected in a water bath, thereafter placed onto a solid carrier or, more precisely the surface thereof. The explanations that follow refer, merely in the interest of clarity, to a collection or placement of the sections on a liquid surface, from which they are then placed onto the solid carrier element, which is provided according to embodiments of the present invention and for which the embodiments provide particularly advantageous solutions. In embodiments of the present invention, the ultra-thin sections generated are caused to float on a liquid surface and are transferred therefrom to the solid carrier element.

Embodiments of the present invention particularly do not relate to methods including a direct placement of sections on the solid carrier element without previously collecting them in a water bath. As mentioned, use of a water bath has the particular advantage that the sections are "stretched" and wrinkles or other deformations caused by the cutting process may be removed. However, using a water bath also can cause the sections to drift away, adhere to wall structures, etc. It is this context in which embodiments of the present invention provide significant advantages.

In the context of embodiments of the present invention, the position and the orientation on the solid carrier element determined for at least some of the sections includes at least one of a rotation, a displacement, a distortion, a folding, and a flip-over of these sections. Each of these parameters may influence the way in which the section images may be assembled into a three-dimensional image. For example, if a rotation is determined for some sections, this can be compensated by a counter-rotation movement or instruction when acquiring image date of the sections, either by counter-rotating the section or a camera system used for image acquisition itself, or by rotating images obtained accordingly. Correspondingly, an image stack can be produced which includes images with significantly reduced rotations, significantly improving and simplifying the process of the generation of three-dimensional image data. Also, distortions of sections, which may be the result of mechanical forces on the sections or certain irregularities, may be compensated accordingly. In extreme cases, e.g. when a folding or a flip-over of sections is determined according to embodiments of the present invention, these sections may also be excluded from later imaging and/or generating of three-dimensional image data. According to embodiments of the present invention, in summary, by determining a position and an orientation on the solid carrier element, highly advantageous preset values may be provided for later imaging and three-dimensional reconstruction.

As mentioned before, by errors such as drifting away of sections on the liquid surface, sticking of sections to the blade or to wall structures, cutting operations without generating an usable section, it can be ensured, using embodiments of the present invention, that two sections subsequently placed on the sample carrier are actually two sections which were produced from the sample directly after another, i.e. there is no further section which was produced but which for whatever reason, did not "make it" to the sample carrier. Embodiments of the invention, in other words, allow to verify a uninterruptedness and a correct order of sections placed on the sample carrier.

In the context of embodiments of the present invention, therefore generally also a sequence in which the sections are detached from the sample may be detected, and detachment of the sections from the sample and/or collection of the sections and/or placement of the sections onto the solid carrier element and/or onto a subsequent transfer device may be monitored by means of one or several observation cameras, accompanied by the acquisition of moving-image data, such as is the case for the determination of the position and orientation on the solid carrier element. Preferably, all three aforesaid steps are monitored in the manner explained.

The monitoring system which is used according to embodiments of the present invention comprises an observation camera, shortly referred to as "camera" here, i.e. but may also comprise several observation cameras. Such observation cameras can be configured for a variety of observation modalities, for example for observation in the visual spectrum or in the infrared, to cover different fields of view, different observation angles, different focal planes, etc. An "observation camera" is understood in the context of embodiments of the present invention as any camera or other optical device that makes it possible to detect in planar fashion, in particular, a surface on which the sections are collected, such as a surface of a water bath or a surface of a solid carrier. A corresponding observation camera may be, however, also configured, for example, to monitor the blade of the microtome being used, and in that context to correspondingly identify and subsequently track each section as it is generated. One or more cameras may be used to track the complete movement of a section from its detachment from the sample to the ultimate placement on a solid carrier element or a sample transfer device such as a slot grid or a wafer. If necessary, a refocusing or change of magnification can be performed, or several observation cameras focused on different planes can be used. One or more observation cameras may also be adapted to record an image through a microscopic stereoscopic observation unit with which the ultramicrotome system is equipped. The latter can be made to refocus, change a magnification, etc., for the observation tasks according to embodiments of the present invention or any step thereof.

As used herein, the terms "camera" or "observation camera" shall not be understood to be restricted to a complete and independently functional optical unit or module, such as a known digital camera or camera attachment to a microscope, but shall be understood to include all sensor or detector units which are, alone or in connection with any further components associated therewith or with other technical units provided according to embodiments of the present invention, adapted to acquire two-dimensional image data, including, but not limited to, sensors like CCD or CMOS sensors, and optionally associated optics and/or electronic circuitry. One or more cameras used according to embodiments of the present invention may, or may not, be associated with a stereoscopic microscope unit which is present in the ultramicrotome anyway. Such a microscope unit may be refocused as needed for detecting objects at different focal planes. As can be seen from the prior art, such as the article by Li et al., solutions are known per se which are suitable to monitor the blade region and the formation of sections. In the prior art, however, a corresponding observation is only made to optimize the cutting process itself. Such solutions could, either alone or together with further observation modalities, additional cameras etc., be used for monitoring the complete transfer process and/or tracking the deposition of the samples on the solid carrier element. Particularly, the process according to embodiments of the present invention may include monitoring at least two of the steps or partial processes including the process if detaching the ultra-thin sections from the sample using the blade, transferal of the section thus formed to the liquid surface, floating of the section on the liquid surface, and transferal of the sections to the carrier.

In the context of embodiments of the present invention, the sections may be tracked in the moving-image data, and positions of the sections on the solid carrier element may respectively be correlated, on the basis of their tracking in the moving-image data, with the sequence in which they were detached from the sample. It is thereby possible to localize the respective sections on the transfer device in accordance with the sequence of their detachment from the sample. As already mentioned, this allows an association of the respective sections on the transfer device with their position in the sectioned sample or with images in a volume image. An orientation may be detected in a similar manner, and all information may be associated or correlated.

Generally, if reference is made to "tracking" herein, this term may refer to any method in which a position of a section on a sample carrier is unambiguously associated to a position of the very same section in the sample from which it is produced, and/or in which a section is kept track in a previous and/or further process. The term "tracking" may also refer to processes of image analysis in which objects are kept track of in moving images or in a series of images, as generally known in the field of image analysis. In other words, tracking of one or more of the sections may be performed using image-processing based tracking algorithms. As discussed in textbooks such as Wu et al. (eds.), "Microscope Image Processing", Academic Press, 2008, ISBN 9780123725783, Chapter 15, "Time Lapse Imaging", such processes, which are classically applied in connection with cell tracking in particular, may particularly include image preprocessing, and the actual tracking may be performed using methods such as disclosed in section 15.6.1, "Cell Tracking", in said textbook. The most extensively studied approaches are, as generally known, level-set based approaches. However, tracking methods usable according to embodiments of the present invention are not necessarily limited to such methods but may e.g. also include processes such as discussed in section 15.6.2, "Particle Pracking", and take into account the items mentioned at the end of this section. Tracking also may be based on additional or inherent features such as fluorescent features which may be made visible by a suitable illumination and detection modalities. A further disclosure of different tracking methods may also be found in Miura K., "Tracking Movement in Cell Biology". In: Rietdorf J. (ed.) "Microscopy Techniques". Advances in Biochemical Engineering, vol. 95m Springer, 2005 and other books and articles representing general technical knowledge of the skilled person. Tracking may also be performed across images or image data from different cameras, particularly after image registration.

Tracking may also be based on geometrical shapes of the sections and tracking may be simplified by giving the sections a particular shape, particularly by choosing a particular geometrical shape of the sample material embedded in a sample block or by trimming the sample block in a particular way before sectioning to result in a particular geometrical shape when sectioned. Geometrical shapes usable in this connection may include irregular shapes which particularly simplify the determination by which amount a section has been rotated. Shapes my include polygons or shapes surrounded by irregularly shaped curves. More generally, all shapes which are not rotational symmetric, can be used. The term rotational symmetry is used herein according to usual definitions.

As already mentioned for the monitoring process before, embodiments of the present invention may include tracking sections accordingly in at least two of the steps or partial processes including the process if detaching the ultra-thin sections from the sample using the blade, transferal of the section thus formed to the liquid surface, floating of the section on the liquid surface, and transferal of the sections to the carrier.

In the method according to embodiments of the present invention, the solid carrier element may be dissected into several carrier element parts after placing the sections detached from the sample onto the solid carrier element. Such carrier element parts may then be placed onto a transfer device, such as a slot grid as mentioned, or any other transfer device suitable for use with (electron) microscopy. At least for some of the carrier element parts generated by dissecting the carrier element, like for the sections itself, a position and/or an orientation on the transfer device may be determined by monitoring the placement of these carrier element parts onto the transfer device using the monitoring system provided according to embodiments of the present invention, or a further monitoring system also provided according to a corresponding embodiment the present invention. In this embodiment, therefore, the sections can be tracked from the detachment of the sample block until their ultimate position in which they are observed. Correspondingly, the formation of three-dimensional image data can be further simplified according to this embodiment of the invention.

The monitoring system used according to embodiments of the present invention for monitoring the placement of the sections onto the solid carrier element does not necessarily have to be the same as the monitoring system used for monitoring the placement of the carrier element parts onto the transfer device, but, as mentioned, a further, at least partially independent monitoring system can be used instead, the latter especially comprising at least one further camera. The monitoring systems mentioned can thus be physically, functionally, or spatially separated elements or units, or may at least comprise components which are physically, functionally, or spatially separated, especially corresponding cameras. In the alternative, however, also the same monitoring system may be used, i.e. one functional unit, which however, can comprise several functional or constructional sub-units such as cameras dedicated for specific monitoring tasks.

In the case of ssSEM, the transfer device can in particular be a silicon wafer that serves for investigation in a scanning electron microscope, or any other transfer device that is configured for investigating a corresponding sample in a microscopic investigation system or for transferring it thereinto. In the case of ssTEM, in particular, a known grid can be used. On a corresponding transfer device, the sections are, in particular, processed using suitable contrasting methods, for example by vapor-coating or infiltration with dyes or heavy-metal salts. Corresponding contrasting can, however, also have been already performed previously, before the sample is subjected to the method according to embodiments of the present invention.

In the context of embodiments of the present invention, the entire transfer device with the individual sections placed onto the carrier element parts can be microscopically investigated, and the respective sections can be associated, based on their prior tracking and position determination, with a volume image that is to be generated. In other words, an uninterrupted tracking from start to end is possible.

In the method according to embodiments of the present invention, in other words, monitoring using the monitoring system may comprise acquiring moving-image data, wherein the sections may be tracked in the moving-image data. Positions of the sections on the solid carrier element may thus be correlated, on the basis of the tracking in the moving-image data, with a sequence in which the sections were detached from the sample.

In the context of embodiments of the present invention, detachment of at least some of the sections from the sample can encompass the generation of section ribbons, as has been explained previously in principle. However, also individual sections may be placed onto the solid carrier element. In other words, according to an embodiment of the invention, the detachment of at least some of the sections from the sample encompasses the generation of section ribbons in which the sections adhere to each other, wherein the sections are placed at least in part in the form of such section ribbons onto the solid carrier element. In a different embodiment, the detachment of at least some of the sections from the sample encompasses the generation of individual sections not adhering to each other, wherein the sections are placed at least in part in the form of such individual sections onto the solid carrier element. Also, a partial collection and placement in the form of section ribbons and of individual sections is possible.

The sections can then at least in part be collected in the form of section ribbons, if formed, for example on a liquid surface, before the placement on the solid carrier element. Because the sample sections are tracked in the moving-image data that are generated, these section ribbons can likewise each be correspondingly associated. In contrast to the known methods explained earlier, it is not necessary in this context to deposit the section ribbons in a defined sequence, for example, on a solid carrier element or ultimately on the transfer device. The section ribbons can also be generated with a variable section-ribbon length, so that the complex generation of section ribbons of maximum length is no longer necessary the problems associated therewith can be avoided. In particular, it is thereby possible to prevent bending and breaking of overly long section ribbons. In addition, disintegration of the section ribbons, which occurs more or less often depending on the sample, is no longer an issue thanks to the tracking of the sections.

Considerably denser packing of corresponding sections on the transfer device can be effected in the context of embodiments of the present invention than in the existing art. This can be achieved, for example, by the fact that the number of sections in a corresponding section ribbon or in several corresponding section ribbons is adapted in order to achieve a maximally dense section-ribbon cluster or section-ribbon packing in a region of the transfer device and previously, for example, on a liquid surface.

In the context of embodiments of the present invention, tracking of the positions of the sections can encompass detection of a motion of the sections as they are detached from the sample and/or as they are collected, for example on a liquid surface, and/or as they are placed onto the carrier element or subsequently thereto on the transfer device. All the motion processes that conventionally would result in a loss of the association of the respective sections with their location in the sample or which would change the position or orientation can thereby be detected in the context of embodiments of the present invention. Different tracking algorithms that are known in principle from the existing art can be used, for example, in the context of embodiments of the present invention. The tracking algorithms can be based, for example, at least in part on the fact that a movie is recorded, and that the displacements of the sections between the acquisition of two movie images are so small that when the movie images are compared, the association is unequivocal based on the overlap. In this embodiment, image pairs that are close together in time are repeatedly compared so that the association of the respective sections with their location in the sample is retained. On the other hand, for example, individual features such as shapes, colors, or structures within the moving sections can also assist association for tracking. Reference is again be made to the general knowledge of the skilled person.

In the context of embodiments of the present invention, in particular each of the sections may be numbered upon detachment from the sample, and tracking of the positions and/or orientations of the sections may be carried out while maintaining their numbering. An association between the positions of the sections on the transfer device and the sequence in which they were detached from the sample may be made on the basis of the numbering. Particularly simple association can thereby be achieved.

In particular, in the context of embodiments of the present invention the monitoring data may comprise, or may be used in generating a dataset comprising, for at least some of the sections detached from the sample for which the position and an orientation on the solid carrier element are determined, at least one of a position indicator and an orientation indicator, particularly relative to a reference position or orientation or a reference system or framework. That is, a corresponding dataset may be provided which essentially describes all positions and orientations of the sections observed, and to be examined subsequently. In an embodiment of the present invention, it is possible to create a location map of the sections, the sections being numbered in the location map in accordance with the sequence in which they were detached from the sample and additionally their position and orientation. The location map thus describes the location of the sections on the transfer device in accordance with their detachment sequence, and can be used for the aforementioned association. Numbering can occur in real time, i.e. a respective number can be associated with each section as or after it is generated, and each section can then be tracked using that number. To each section in a corresponding location map, an orientation of the section may be associated. Alternatively thereto, however, numbering can be performed only after the sectioning operation is completed, using the recorded moving-image data. In this case as well, tracking is possible using the respective number.

In embodiments of the present invention, the solid carrier element may be provided to include machine-readable identifiers for target and/or reference positions of the sections to be placed onto the solid carrier element. Such machine-readable identifiers may additionally be provided to be human-readable or detectable under defined imaging modalities and they may e.g. be provided including at least one of a line code, a quick response (QR) code, a geometrical shape, a letter, a number, and a marking color. Using a corresponding identifier, each section, to which the orientation has already been associated, may be identified, simply by detecting the identifier.

As mentioned, in the context of embodiments of the present invention the sections can be used or generated as semi- or ultra-thin sections, and a glass or diamond blade can be used as the blade. The blades can be part of corresponding blade units that can also comprise a trough for receiving a liquid that is used to constitute a liquid surface on which the sections can be collected.

Embodiments of the present invention also relate to a method for three-dimensional reconstruction of a microscopic sample, in which ultra-thin sections of the sample are microscopically investigated, acquiring section image data, and in which the section image data are assembled into a volume image. According to embodiments of the present invention, the ultra-thin sections of the sample are generated by means of a method that has been explained above in different embodiments, and assembling the section image data into the volume image is performed based on the monitoring data obtained using the monitoring system or based on data derived from such monitoring data. With regard to features and advantages of a corresponding method and its advantageous embodiments, reference is expressly made to the explanations above, since they also relate to the method according to embodiments of the present invention for three-dimensional sample reconstruction.

The microscopic investigation can encompass in particular an investigation using light microscopy or electron microscopy.

According to embodiments of the invention, the section image data may be acquired and/or assembled into the volume image by using an image acquisition and/or analysis system, wherein the monitoring data or the data derived from the monitoring data may be transferred from the monitoring system to the image acquisition and/or analysis system. Parameters of the microscopic device such as rotation of a detection unit, a lateral displacement of a microscope table, etc., may be adjusted based on the monitoring data obtained using the monitoring system or data derived from the monitoring data.

Embodiments of the present invention furthermore relate to an ultramicrotome system for generating a series of ultra-thin sections of a microscopic sample, the microtome system being adapted to detach sections from the sample and to place the ultra-thin sections detached from the sample onto a solid carrier element. According to embodiments of the present invention, the ultramicrotome system comprises a monitoring system comprising a camera, the monitoring system being adapted to determine for at least some of the sections detached from the sample a position and an orientation on the solid carrier element by monitoring the placement of these sections onto the solid carrier element, obtaining monitoring data. Also, with regard to features and advantages of a corresponding microtome system and its advantageous embodiments, reference is expressly made to the explanations above. As repeatedly mentioned, the sections are caused to float on a liquid surface before the sections are transferred to the carrier element.

The ultramicrotome system provided according to embodiments of the present invention may particularly comprise a feeding system adapted to provide the solid carrier element in the form of a ribbon-like structure, as explained above, and to position the solid carrier element for placing the sections detached from the sample thereon.

As used herein the term "and/or" includes any and all combinations of one or more of the associated listed items and may be abbreviated as "/". Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or software. The implementation can be performed using a non-transitory storage medium such as a digital storage medium, for example an HDD, an SSD, a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable. Some embodiments according to the invention comprise a data carrier having electronically readable control signals, which are capable of cooperating with a programmable computer system, such that one of the methods described herein is performed using the computer system.

Generally, embodiments of the present invention can be implemented as a computer program product with a program code, the program code being operative for performing one of the methods when the computer program product runs on a computer. The program code may, for example, be stored on a machine-readable carrier. Other embodiments comprise the computer program for performing one of the methods described herein, stored on a machine-readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the invention is an apparatus as described herein comprising a processor and the storage medium.

A further embodiment is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein. A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

Embodiments of the invention will be illustrated in further detail below with reference to the appended drawings.

In the Figures, elements that correspond physically or functionally to one another are indicated with identical reference characters, and in the interest of clarity are not explained repeatedly.

Figure 1C:
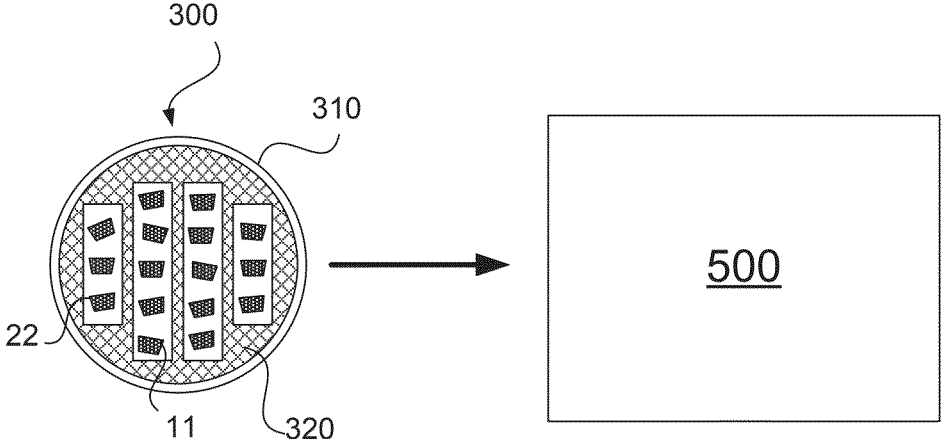

FIGS. 1A to 1C illustrate, in a highly simplified set of perspective views, an arrangement used in a method not forming part of embodiments of the invention and parts thereof. FIGS. 1A to 1C likewise correspond to method steps being performed using such equipment.

A microtome system used according to FIG. 1A comprises a microtome 100 and a feeding unit 200 for a solid sample carrier; the system being not in accordance with an embodiment of the invention. The microtome system as a whole is labeled 900.

In the example depicted, in the microtome 100 a sample 10 is fixed in a sample holder 102. A water bath 104 (illustrated in simplified form for reasons of generality) is provided for collecting sections 11 of the sample 10 using a blade and used as generally known per se. The microtome 100 comprises sample positioning elements 106, a sample feed system 108, and a microscope 110 with optical and position adjusting elements 112, 114, and a security shield 116. A liquid feed system 120 is also present. The microtome is embodied as an ultramicrotome and may be provided in any manner known in the prior art.

It should be understood that, even if the sections 11 are shown here in a trapezoid shape, they may comprise any conceivable geometry, such as circular, rectangular, polygonal or irregular, essentially according to the shape of the sample. The sections are not necessarily drawn to the correct perspective or scale.

In order to transfer the sections 11 to a solid sample transfer element 300 comprising a frame 310 and a grid 320, these sections 11 are first placed, in a step depicted in FIG. 1A with an arrow, onto a ribbon-, belt- or band-like solid sample carrier element 20 which is provided in the form of a reel 210 by the feeding unit 200. The feeding unit 200 can be part of the microtome 100, i.e. it may be integrated into the same functional unit, or provided separately. The feeding unit 200 may likewise comprise positioning means for positioning the solid sample carrier 20 at a position suitable for placing the sections 11 onto it. Other than shown in the specific example depicted, the sample carrier 20 may also be provided in an essentially endless manner, and it may e.g. also be adapted to fish sections 11 from a water bath 104 in which, or, more precisely, on whose surface (not individually labelled), they were initially collected or made to float. For examples of microtomes 100 comprising corresponding feeding units 200 for solid sample carrier elements, reference is made to specialist literature and to the explanations given above already.

The solid sample carrier element 20 is then, according to a step depicted in FIG. 1B, cut according to lines 24, e.g. by hand, into pieces or carrier element parts 22 which are placed, as again shown with arrows, on the sample transfer element 300 such as a known slot grid. Positions not yet used on the sample transfer element 300 are shown in a dashed representation. In the example shown, the sample transfer element 300 comprises a circular frame 310 and a grid 320, but the sample transfer element 300 may be embodied in any conceivable manner. The sample transfer element 300 may e.g. also be provided in the form of a wafer. The sections on the sample transfer element 300 or on the carrier element parts 22 may be treated in a suitable manner, e.g. by staining, contrasting or metallization.

As shown in FIG. 1C, the sample transfer element 300 including the carrier element parts 22 and the sections 11 thereon, is moved to a microscopic examination device 500, e.g. to a light or electron microscope or including such a device, for further examination and e.g. for reconstructing three-dimensional information. The microscopic examination device 500 may include image acquisition and/or processing means of any kind known in the art in order to provide images of the sections 11 and to assemble such section images into a three-dimensional or volume image.

Figure 2A:
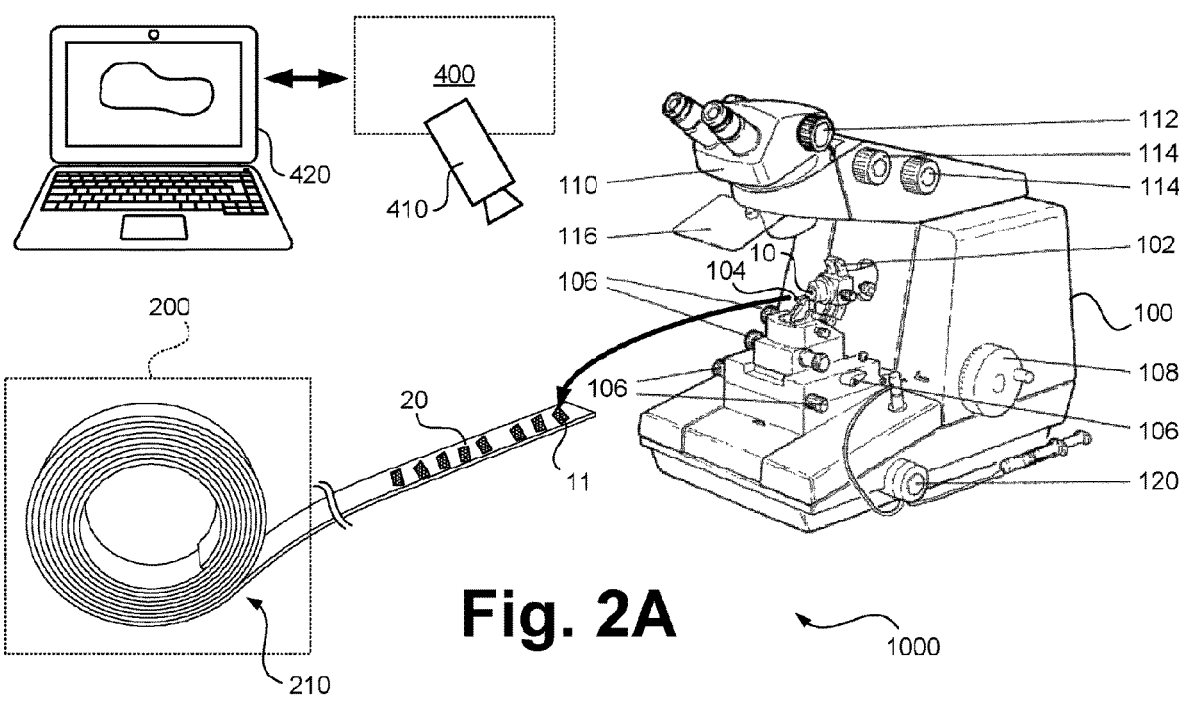
FIGS. 2A to 2C are highly simplified perspective views of an arrangement used in a method according to a preferred embodiment of the invention.
Figure 2B:
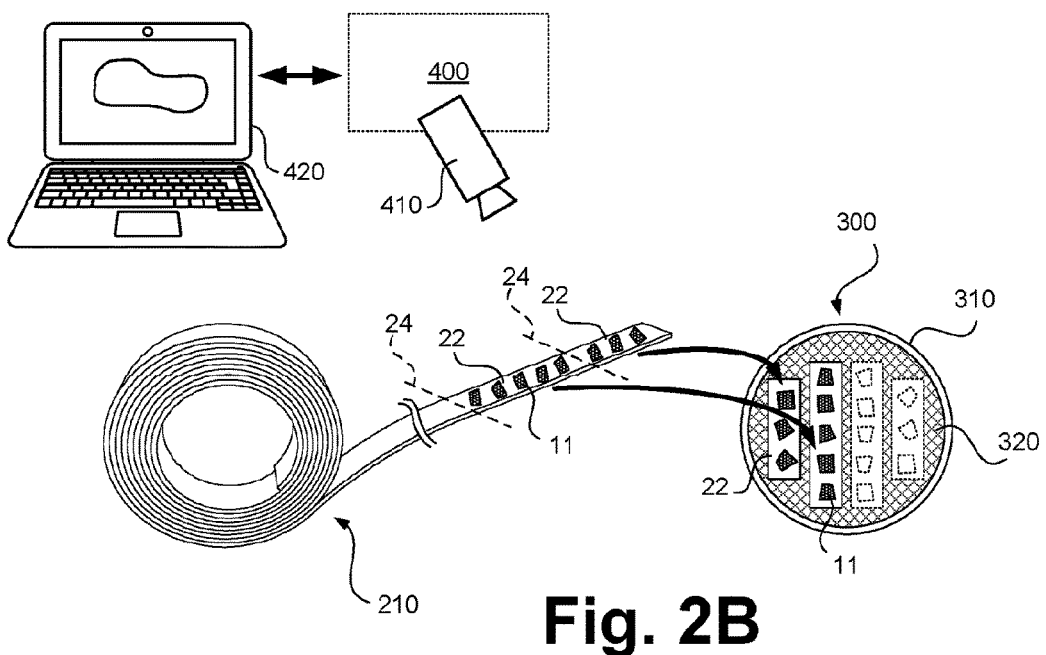
Figure 2C:
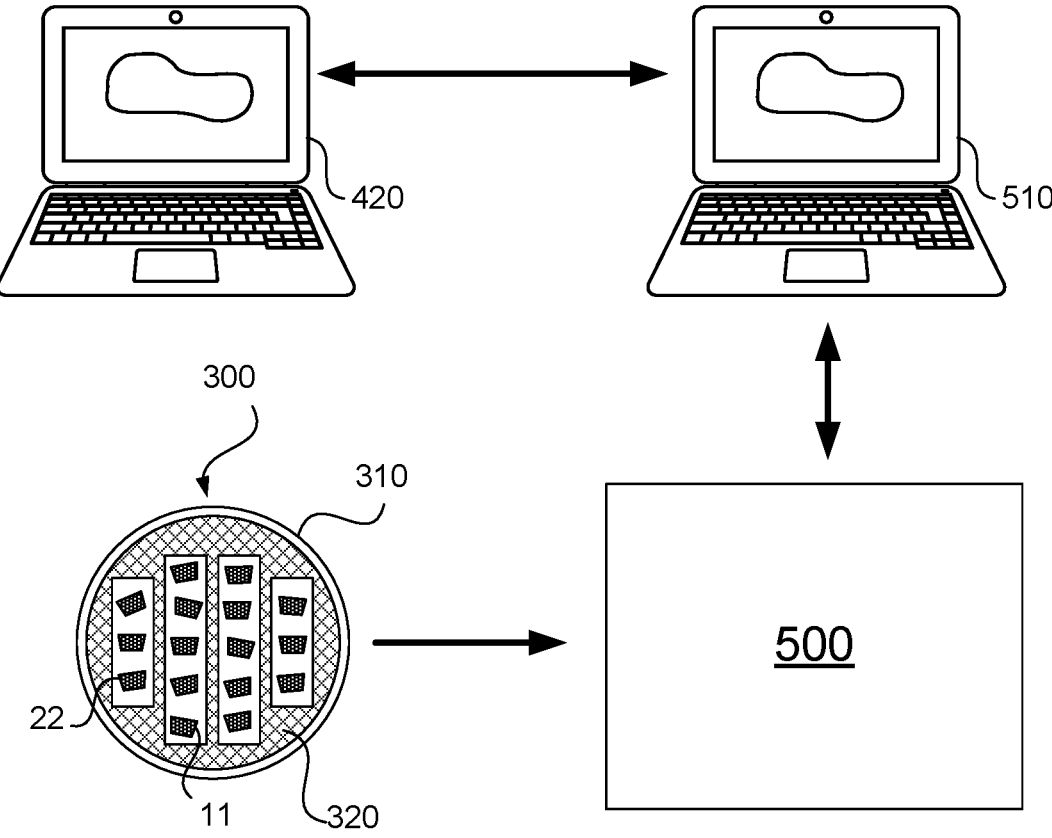

The same explanations given for FIGS. 1A to 1C essentially apply to FIGS. 2A to 2C and repetitions are avoided for conciseness only. FIGS. 2A to 2C illustrate, in a highly simplified side set of perspective views, an arrangement used in a method according to an embodiment of the present invention and parts thereof. FIGS. 2A to 2C likewise correspond to method steps according to an embodiment of the present invention being performed using such equipment.

A microtome system used according to FIG. 2A, essentially as already explained for FIG. 1A, comprises a microtome 100, in particular an ultramicrotome, and a feeding unit 200 for a solid sample carrier. The microtome system as a whole is labeled 1000 and is associated with a monitoring system 400 comprising, in the example shown, a camera

410. Reference is made to the explanations above regarding the term "camera". The monitoring system 400 is provided with, or connected to, a control unit 420 such as a computer, which also may be adapted to control further functions of the microtome system 1000. As mentioned, any number and arrangement of one or more cameras 410 can be used according to the present invention.

According to an embodiment of the invention, as illustrated, for at least some of the sections 11 detached from the sample 10 a position and an orientation on the solid carrier element 20 are, according to FIG. 2A, determined by monitoring the placement of these sections 11 onto the solid carrier element 20 using the monitoring system 400, obtaining monitoring data. These may be locally or remotely stored or may be communicated to other systems, via a local network or over the internet.

The monitoring data may, as shown in FIG. 2C, be exchanged with a control unit 510, especially a computer, associated to the microscopic examination device 500, in order to detect the sections in a preferable manner and/or to assist in reconstructing three-dimensional image data from section images in an image processing unit. The control unit 510 may particularly be used to set imaging parameters or microscope parameters such as a detection or image location or rotation. The control units 420 and 510 may also be integrated into a single device.

Some embodiments relate to a microtome system 1000 or a microscopic examination device 500. For example, the microtome system 1000 and/or the microscopic examination device 500 may be configured to take images and may be connected to the control unit 510 and/or 420. The control unit 510 and/or 420 may be configured to execute at least a part of a method described herein. The control unit 510 and/or 420 may be configured to execute a machine learning algorithm. The control unit 510 and/or 420, as well as all other components shown, may be separate entities but can also be integrated together in one common housing. The control unit 510 and/or 420 may be may be part of a central processing system and/or the control unit 510 and/or 420 may be part of a subcomponent of the microtome system 1000 and/or the microscopic examination device 500, such as a sensor, an actor, a camera or an illumination unit, etc. of the microtome system 1000 and/or the microscopic examination device 500.

The control unit 510 and/or 420 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The control unit 510 and/or 420 may comprise any circuit or combination of circuits. In one embodiment, the control unit 510 and/or 420 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the control unit 510 and/or 420 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The control unit 510 and/or 420 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The control unit 510 and/or 420 may also include a display device, one or more speakers, and a keyboard and/or controller, which can include a mouse, trackball, touch screen, voice-recognition device, or any other device that permits a system user to input information into and receive information from the control unit 510 and/or 420.

Figure 3:
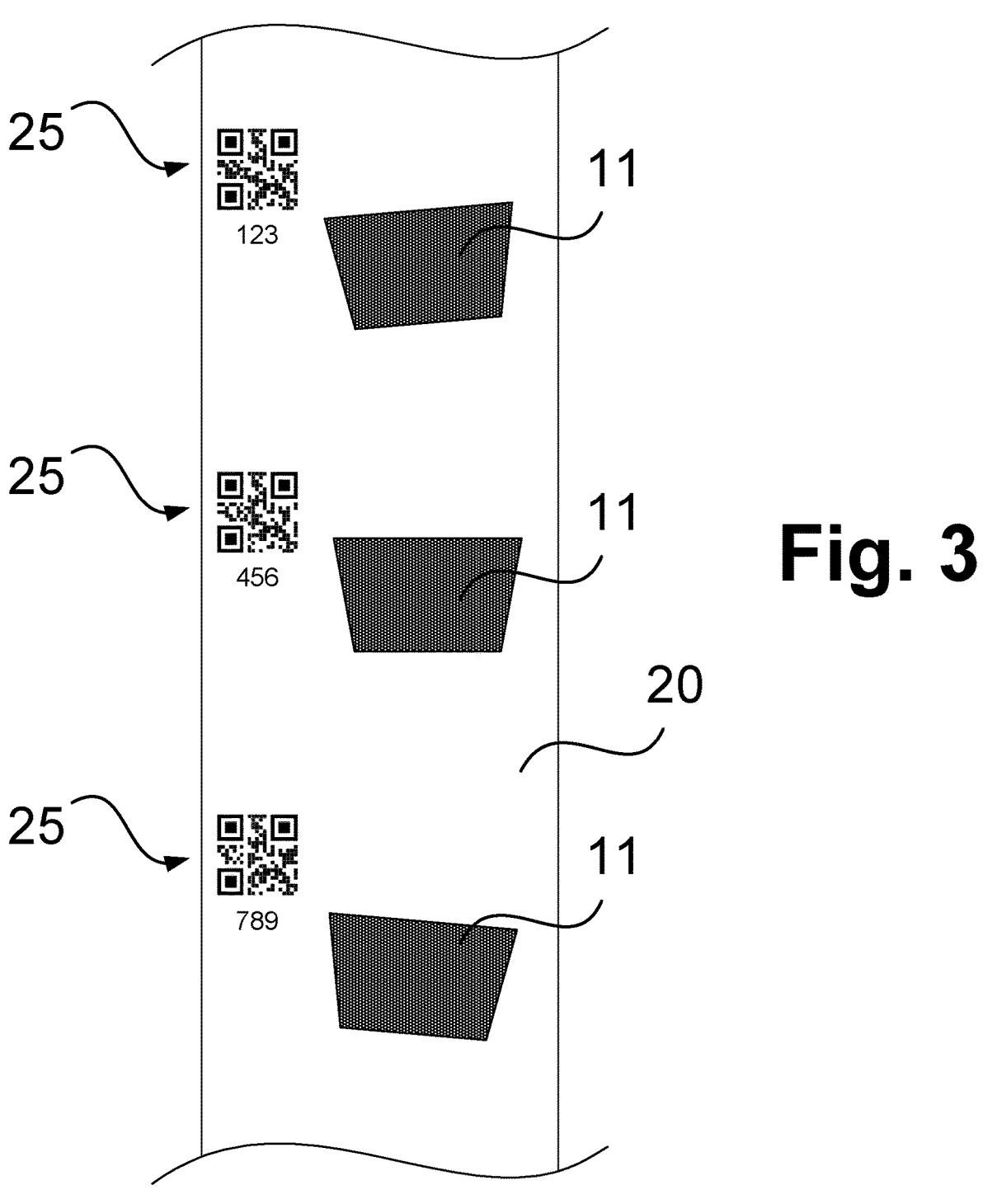
FIG. 3 is a highly simplified view illustrating a sample carrier element used in a method in accordance with an advantageous embodiment of the invention.

FIG. 3 is a simplified top view illustrating a sample carrier element 20 used in a method in accordance with an advantageous embodiment of the invention. As shown, the sample carrier element 20, on which the sections 11 are placed, comprises machine-readable identifiers 25 including, in the example shown, quick response codes. Additionally thereto, human-readable numbers are provided.

Figure 4:
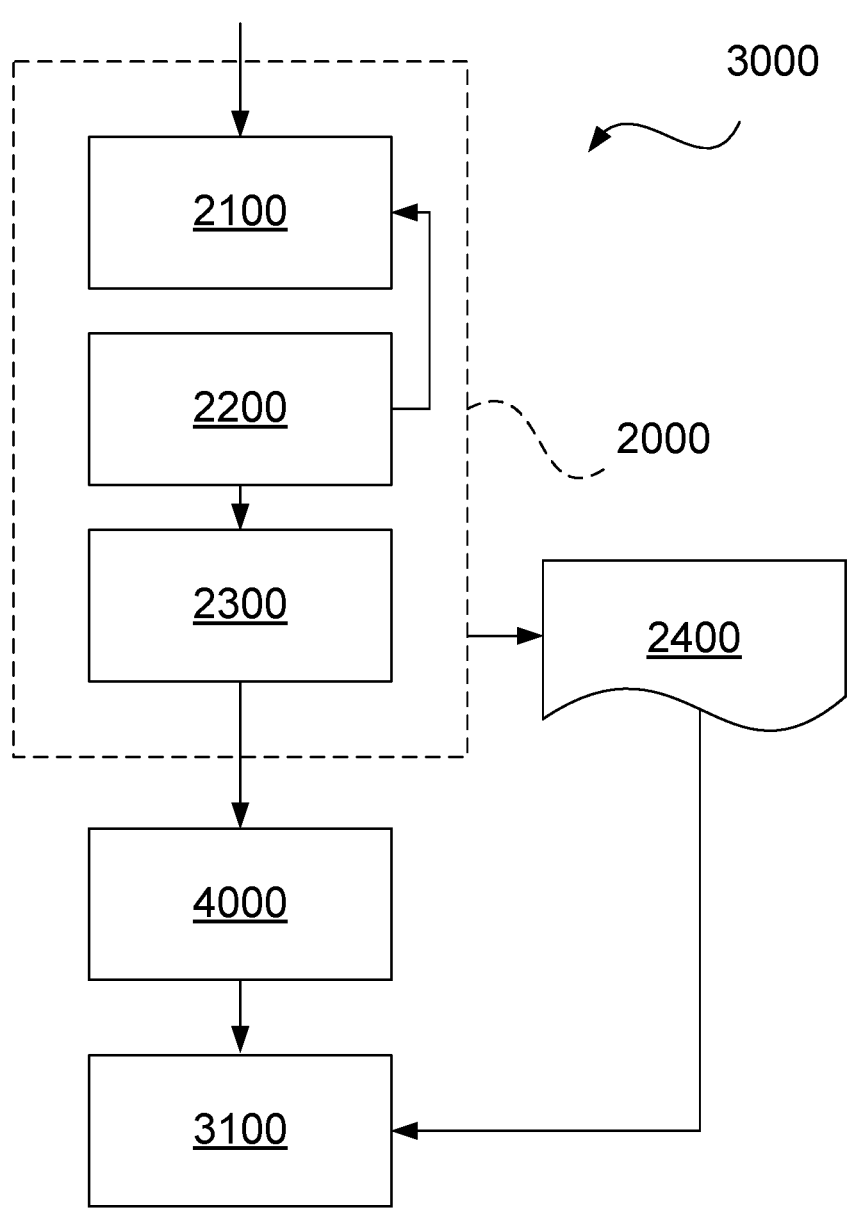
FIG. 4 is a schematic flow chart illustrating a method in accordance with an advantageous embodiment of the invention.

FIG. 4 is a schematic flow chart illustrating a method in accordance with an advantageous embodiment of the invention, which is indicated 3000 in its entirety. The method 3000 is used for the three-dimensional reconstruction of a microscopic sample, such as the sample 10 shown before, by imaging sections such as sections 11, essentially as shown before.

A method 2000 for generating a series of sections 11 of a microscopic sample 10 thus forms part of the method 3000. In the method 2000, the sections 11 are detached from the sample 10 in a method step 2100 using an microtome such as the microtome 100 as shown before, and in a method step 2200 the sections 11 detached from the sample 10 are placed onto a solid carrier element such as the solid carrier element 20 as shown before. As shown, the method steps 2100 and 2200 may be repeated until a sufficient number of sections has been placed on the solid carrier element 20. Thereafter, in a method step 2300, the solid carrier element may, optionally be dissected into several carrier element parts, such as shown before for the carrier element parts 22, and the carrier element parts may be are placed onto a transfer device such as the transfer device 300 shown before.

In the method 2000, at least for some of the sections detached from the sample a position and an orientation on the solid carrier element are determined by monitoring the placement of these sections onto the solid carrier element using a monitoring system comprising a camera, such as the monitoring system 400 shown before, obtaining monitoring data, as indicated with 2400. Also at least for some of the carrier element parts generated by dissecting the carrier element in step 2300, a position and an orientation on the transfer device 300 may be determined by monitoring the placement of these carrier element parts onto the transfer device 300 using the monitoring system.

In an intermediate method step 4000, the carrier element or parts thereof placed on a transfer device 300 are transferred to a microscopic examination system, such as the microscopic examination system 500 shown before.

In a method step 3100, the sections of the sample are microscopically investigated using the microscopic device, acquiring section image data, and the section image data are assembled into a volume image based on the monitoring data obtained using the monitoring system or based on data derived from the monitoring data.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for three-dimensional reconstruction of a microscopic sample, the method comprising:
   detaching a series of ultra-thin sections from the sample using an ultramicrotome continuously, wherein the series of sections detached from the sample are made to float on a liquid surface of a water bath, and thereafter collecting and transferring the series of sections onto a solid carrier element, wherein the series of sections are being stretched caused by the floating to counteract deformations caused by the detaching;
   determining, for at least one of the each respective section of a plurality of consecutive sections detached from the sample, a position and an orientation on the solid carrier element by:
      acquiring moving-image data, using a camera of a monitoring system, as the plurality of consecutive sections are being transferred onto the solid carrier element, and
      monitoring the placements of the plurality of consecutive sections onto the solid carrier element using the monitoring system by tracking the plurality of consecutive sections in the moving-image data, so that the plurality of consecutive sections is associated with a sequence in which the plurality of sections is detached from the microscopic sample and hence with positions in the microscopic sample;
   obtaining monitoring data, wherein the monitoring data comprises for at least one of the sections detached from the sample for which the position and the orientation on the solid carrier element is determined, a position indicator and an orientation indicator relative to a reference position or orientation;
   microscopically investigating the series of sections of the microscopic sample using a microscopic device; and acquiring section image data, wherein the section image data are assembled into a volume image, and wherein the assembling the section image data into the volume image is performed based on the monitoring data obtained using the monitoring system or based on data derived from the monitoring data.

2. The method according to claim 1, comprising:
   dissecting, after placing the sections detached from the sample onto the solid carrier element, the solid carrier element into several carrier element parts;
   placing the carrier element parts onto a transfer device; and
   determining, for at least for one of the carrier element parts generated by dissecting the carrier element, a position and/or an orientation on the transfer device by monitoring the placement of the carrier element parts onto the transfer device using the same monitoring system or a further monitoring system.

3. The method according to claim 1, wherein the detachment of the series of sections from the sample encompasses the generation of section ribbons in which the sections adhere to each other, and in which the sections are placed at least in part in the form of such section ribbons onto the solid carrier element.

4. The method according to claim 1, wherein the detachment of the series of sections from the sample encompasses the generation of individual sections not adhering to each other, and in which the sections are placed at least in part in the form of such individual sections onto the solid carrier element.

5. The method according to claim 1, wherein the solid carrier element is provided to comprise machine-readable identifiers for target positions and/or reference positions of the sections to be placed onto the solid carrier element.

6. The method according to claim 1, wherein the section image data are acquired and/or assembled into the volume image by using an image acquisition system and/or an image analysis system, the monitoring data or the data derived from the monitoring data being transferred from the monitoring system to the image acquisition system and/or the image analysis system.

7. The method according to claim 1, further comprising:
   adjusting parameters of the microscopic device based on the monitoring data obtained using the monitoring system or the data derived from the monitoring data.

8. The method according to claim 1, comprising:
   dissecting, after placing the sections detached from the sample onto the solid carrier element, the solid carrier element into several carrier element parts;
   placing the carrier element parts onto a transfer device; and
   determining, for at least for one of the carrier element parts generated by dissecting the carrier element, an orientation on the transfer device by monitoring the placement of the carrier element parts onto the transfer device using the same monitoring system or a further monitoring system.

9. The method according to claim 1, wherein the solid carrier element is provided to comprise machine-readable identifiers for target positions of the sections to be placed onto the solid carrier element.

10. The method according to claim 1, wherein the section image data are acquired and/or assembled into the volume image by using an image analysis system, the monitoring data or the data derived from the monitoring data being transferred from the monitoring system to the image analysis system.

11. A system for three-dimensional reconstruction of a microscopic sample, the system comprising:

an ultramicrotome system for generating a series of ultra-thin sections of a microscopic sample, the ultramicrotome system being configured to detach the series of ultra-thin sections from the sample, to cause the series of sections to float on a liquid surface of a water bath, and to thereafter collect and transfer the series of sections onto a solid carrier element, wherein the series of sections are being stretched caused by the floating to counteract deformations caused by the detaching, the ultramicrotome system comprising:

a monitoring system comprising a camera, the monitoring system being configured to:

determine for at least one of the each respective section of a plurality of consecutive sections detached from the sample, a position and an orientation on the solid carrier element by:

acquiring moving-image data using the camera as the plurality of consecutive sections are being transferred onto the solid carrier element, and monitoring placements of the plurality of consecutive sections onto the solid carrier element by tracking the plurality of consecutive sections in the moving-image data, so that the plurality of consecutive sections is associated with a sequence in which the plurality of sections is detached from the microscopic sample and hence with positions in the microscopic sample; and obtain monitoring data, wherein the monitoring data comprise or are used in generating a dataset comprising, for at least one of the sections detached from the sample for which the position and the orientation on the solid carrier element is determined, a position indicator and an orientation indicator relative to a reference position or orientation; and a microscopic device and an image analysis system comprising one or more processors configured to:

microscopically investigate the series of sections of the microscopic sample, and acquire section image data, wherein the section image data is assembled into a volume image, and wherein the assembling the section image data into the volume image is performed based on the monitoring data obtained using the monitoring system or based on data derived from the monitoring data.

12. The system according to claim 11, comprising a feeding system configured to:

provide the solid carrier element in the form of a ribbon-like structure; and position the solid carrier element for placing the sections detached from the sample thereon.

13. A non-transitory computer-readable medium storing computer-executable program code for performing the method according to claim 1 when the computer program is executed by a processor.

\* \* \* \* \*